United States Patent [19]

Boccoli

[11] 4,051,080
[45] Sept. 27, 1977

[54] METHOD FOR RECLAIMING CURED RUBBER SCRAPS

[75] Inventor: Temistocle Boccoli, Broni, Pavia, Italy

[73] Assignee: Piovanelli Macchinari e Impianti S.p.A., S. Ilario D'Enza, Italy

[21] Appl. No.: 575,064

[22] Filed: May 6, 1975

[30] Foreign Application Priority Data

May 14, 1974 Italy .................................. 22685/74

[51] Int. Cl.² ........................................... C08J 11/04
[52] U.S. Cl. ..................................... 260/2.3; 260/720
[58] Field of Search ............................... 260/2.3, 720

[56] References Cited

U.S. PATENT DOCUMENTS 2,653,915   9/1953   Elgin et al. ........................... 260/2.3
3,272,761   9/1966   Glenn et al. .......................... 260/2.3
3,954,681   5/1976   Castle .................................. 260/2.3

Primary Examiner—Howard E. Schaw
Assistant Examiner—W. C. Danison, Jr.
Attorney, Agent, or Firm—Cushman, Darby & Cushman

[57] ABSTRACT

A method for reclaiming rubber in which the scraps to be reclaimed are treated in an autoclave at a temperature which is always below the temperature at which the scraps had been cured, with continuous agitation and under the pressure of a fluid (such as air) fed to the autoclave at the ambient air temperature. The processing time is a function of the other parameters and can easily be determined experimentally depending upon the nature of the material to be reclaimed and the plasticity to be obtained.

6 Claims, 1 Drawing Figure

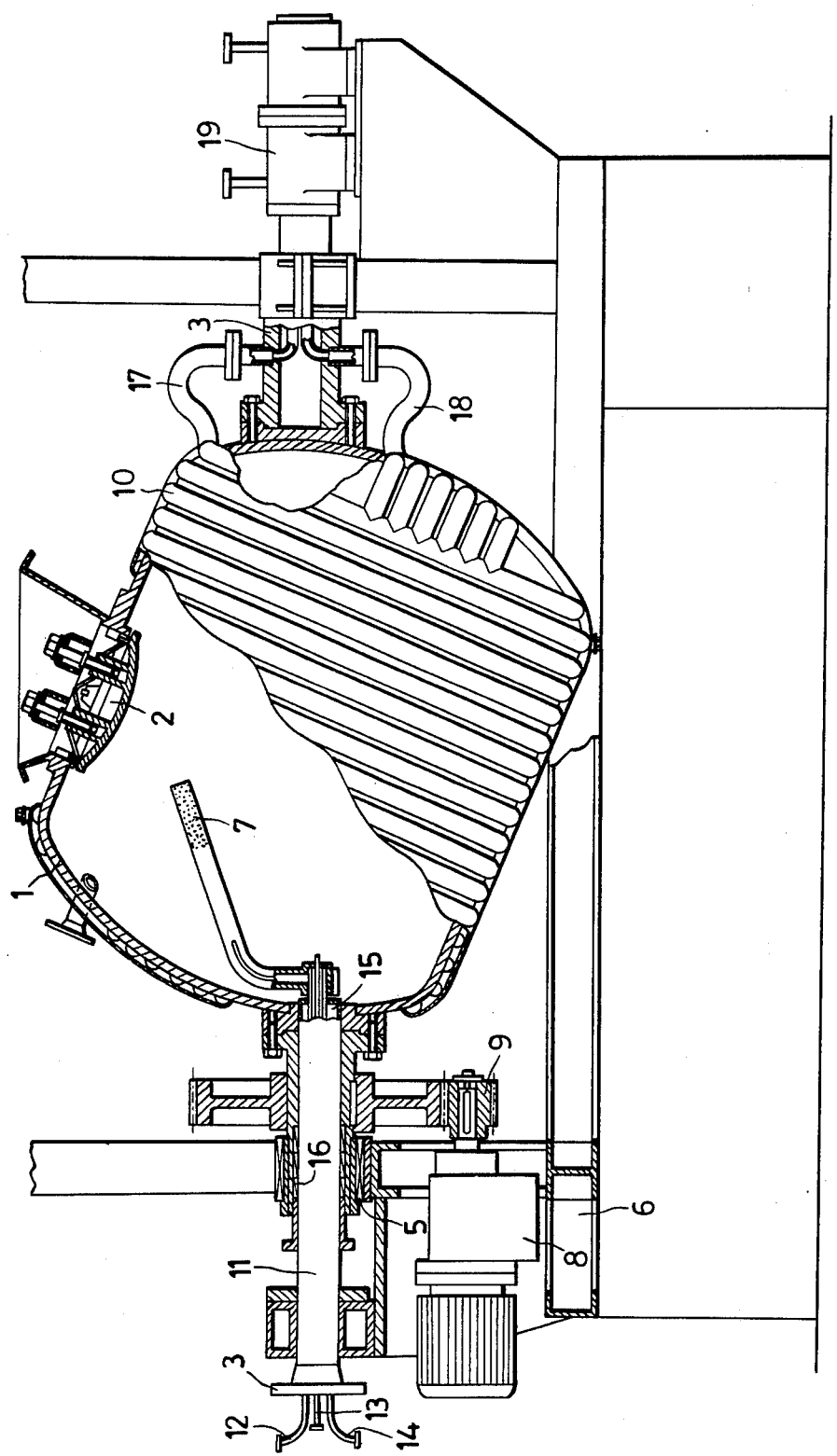

METHOD FOR RECLAIMING CURED RUBBER SCRAPS

This invention relates to a method for reclaiming vulcanized rubber scraps, consisting in the conversion of their elastic condition to the plastic one. In a practical and economically acceptable manner, there is obtained a reclaimed rubber having improved physical properties over the quality of the scraps from which it derives, as well as a constant degree of plasticity which can be graduated according to the individual requirements. The scraps are adapted to be appropriately reused as a raw material in the manufacture of rubber articles in general.

All known methods for reclaiming rubber vulcanizates require subjecting the mass of vulcanized rubber to thermal stresses at temperatures which are always above the curing temperature of the kind of vulcanizate to be plastified.

The conventional treatments are effected by means of autoclaves of any kind and also with extruders, such as the American Reclaimator, at very high temperatures, which are from 50° Centigrade and more above the curing temperatures of the vulcanizates to be plasticized: this curing point, for the great majority of the cured rubber scraps ranging from 150° C to 160° C is necessary to effect plastification through the breakage of the molecular cells of the vulcanized polymer. These methods, which could be adopted when the vulcanizates were predominantly made of natural rubber, are no longer usable since the great majority of the rubber goods, especially the tires, are made of several types of synthetic rubber, occasionally admixed with India rubber. For mixtures of synthetic rubbers, prior art reclaiming methods are unable to produce an economically acceptable reclaimed rubber having such properties as to enable them to be used as the raw material in the manufacture of rubber articles. The processing difficulties which are encountered with all the conventional methods for reclaiming vulcanizates composed of a number of mixed polymers (a fraction of the polymers hardens instead of becoming plastic while the remaining fraction is plasticized to an excessive degree so that a degraded mixture is obtained having deficient and irregular physical properties), are mainly caused by the use of thermal shocks with temperatures which are just above the curing points of the scraps being treated, thereby causing the dielectric breakdown of all the molecules of cured rubber.

Conversely, the novel method is based on the feature of being capable of plasticizing the cured rubber scraps with thermal stresses which are positively below the curing points of the kinds of scraps intended to be plasticized; however, concurrently the scraps are subjected to agitation and pressure below the curing points of the scraps being treated. This is the basic novel feature of the invention and is based on scientific rather than empirical ideas and permits the plasticization of all the kinds of known cured rubber scraps in a practical and economically acceptable way, without producing the breakage of the molecular cells which compose the polymers and without plasticizing them. In accordance with the process, the major fraction of the molecules contained in any kind of rubber, even in vulcanizates comprising several different types of rubber, resumes their original plastic molecular structure with top physical properties and a homogeneous and adjustable degree of plasticity.

The treatment according to the invention is an autoclaving treatment and acts to restore the plastic condition of the part of the molecules contained in vulcanizates another minor fraction, which is not plasticized, is dispersed in the refining run.

The treatment can also be carried out at room temperature and thus can be a "cold treatment" but all other variables in the process being those set forth above, the "cold treatment" involves long periods of treatment time.

This cold reaction was described herein only to its possible relationship to curing of accelerated compounds which are maintained at room temperature, in order to obtain the cure of same. This similarity suggests that the two conversions, namely from the plastic condition to the elastic one for the rubber compounds, and from the elastic configuration of the vulcanizates to the plastic condition of the reclaimed rubbers, occur in rubbers other than those as conventionally used. It also shows that the individual components of the rubber compounds have activities (dependent on time) irrespective of the aid of high temperatures, and affect the reactions which take place both in the curing processes and in the plasticizing runs.

In the plasticizing method according to the invention, the conditions of motion and pressure, while the thermal effects which are due to temperatures below the curing temperatures of the scraps being processed, change the dielectric properties of the scraps being treated a transfer of dielectric properties of material to be treated with materials which have been treated occurs during the process (that is,) Of course, these charge-attracting substances should have an appropriate dielectric susceptivity with values below the dielectric constant of the vulcanizates being treated: the invention suggests the use of air (or other suitable fluids) under different pressures, concurrently with effects of movement and limited thermal stresses.

To carry out in an autoclave the treatment in a practical and economically acceptable way during an appropriate period of time, ranging from 15 to 30 minutes for the great majority of the vulcanizates, and also on account of the necessity of withdrawing the scraps from the autoclave with an adjusted moisture contents which is adapted to refining, it is preferred that the great majority of the vulcanizates is treated at temperatures ranging from 110° C to 140° C while adjusting the plasticity one desires to obtain by varying the duration of the treatment.

Of course, if rubber scraps are treated, which had been cured either at low or at very high temperatures also the necessary thermal stresses used to plasticize them rapidly, are proportionally varied.

As a general rule, the thermal stresses to be used, concurrently with agitation and pressure, in the treatment to plasticize vulcanizates in an autoclave, according to the invention, are limited by the dielectric properties of the vulcanizates which are being treated.

The necessity of detecting the efficient value, is obviated if temperatures which are about 20° C below the curing points of the vulcanizates being treated vary according to the kind and the composition of the mixture of scraps to be processed, the temperatures being preferably above 100° C in order to remove the excess moisture on completion of the processing. These thermal stresses, as a rule and for the majority of the rubber scraps used for the production of reclaimed rubber, remain within the bottom limit of 110° C and the top limit of 140° C.

The basic object of carrying out the treatments at the temperatures confined within the above suggested range is that of retaining the major fraction of the dielectric properties as inherent in the atomic and molecular cells of the rubber which composes the vulcanizates so as to exploit their natural polarization reversing characteristics with a view to obtaining the plasticization according to the method of the present invention.

By so doing, the rubber plasticized in accordance with the invention contains a small percentage of irreversible double bonds which were contained in the vulcanizates just like reclaimed rubbers attained in conventional processes. In accordance with the invention, the vulcanizates are plasticized in the appropriate manner in order to retain the major proportion of their physical properties while preventing a fraction of the vulcanizate from hardening while, also, preventing some other traction of the vulcanizate from becoming too plastic when treating scraps composed by several types of polymers.

Also vulcanizates which had been cured with peroxide-based curing agents, whose chemical composition is radically different from the vulcanizate, can easily be plasticized with the method of this invention.

The result is that it is possible to reclaim any kind of selected scraps, while obtaining reclaimed rubbers of best quality as compared with that of the starting scraps. By treating powders having a grit size of 144 meshes per square centimeter, as they emerge from the autoclave with a plasticity and a moisture contents which can be adjusted as desired, a single refining pass suffices, two refining passes may be employed when using ground scraps, to obtain reclaimed rubber sheets which are smooth and devoid of any cyclization.

By overcoming all the processing difficulties which are encountered with the conventional methods, by a simple and economical treatment, which reduces cost while affording reclaimed rubbers having physical properties which can be profitably exploited in compounding, the method according to the invention enables reclaimed rubber to become competitive with the raw rubber, even with the respect of quality, as a premium raw material.

The processing run is carried out by operating in the following ways:

A. The scraps, classed in the conventional and appropriate ways of the art, must be previously ground or powdered according to what is preferred and, of course, stripped not only of the iron impurities but also of the textile fibers, should these be contained therein. As a matter of fact, by operating the process temperatures which are below the curing points of the scraps being treated, the textile fibers are not reduced to ashes, so that they must be removed in the conventional manner, unless it is preferred to leave them, wholly or in part, in the plasticized scraps, in order to impart certain properties to the resultant reclaimed rubber. The reduction of textile fibers to ashes can be carried out also upon completion of the plasticization, by properly heating, still in an autoclave, the mass of the already plasticized scraps, at the necessary temperatures, but this method is not recommended. It is preferable to remove the textile matters by suction, or to grind them and disperse them in the reclaimed rubber: this fact, however, being outside the scope of the invention.

B. While grinding the scraps, one should recall that the degree of plasticization varies with grit size of the rubber to be reclaimed, so that screening is recommended to obtain a grit size which is as even as practicable.

C. On one or more samples of the mass of scraps as prepared according to A) above, the moisture content and the specific gravity (true and apparent) should be measured. The moisture content should be made up with water amounts, preferably of purified water, to be added into the autoclave, also in the form of steam, or it can be reduced by drying (this can also be made in an autoclave) so that the percentage of water based on the weight of the scraps charged in the autoclave to be processed is preferably contained within the range from 5% to 10% and constantly adjusted to the same proportion when treating scraps of the same type, and is adjusted also when water is metered in higher or lower amounts. The water content in the concentration of fluids contacted with the scraps during autoclaving, including also that contained in the scrap moisture and that contained in the possible saturated steam as fed to the autoclave, is to be calculated, approximately, in the preferred minimum value of 5% when treating scraps composed of similar polymers or polymers having similar dielectric properties, whereas the value of about 10% should be adopted, as a preferred suggestion, when treating scraps composed of several different polymers in admixture, especially those which contain polybutadiene (tire dusts). By varying the water dosage, the other factors being kept constant, the degree of plasticity is also varied, so that the dosages which are adapted to the quality of the scraps, as fixed percentages when treating scraps of the same type, in order to obtain an even degree of plasticization in the industrial production runs, are dictated by the desired results.

The apparent density of the mass of scraps as prepared according to A) above serves to calculate the volume to be charged in the autoclave, which is roughly two thirds of the autoclave volume, so that the scraps may be subjected, during the treatment, to admixing and position-changing movements. The weight of the scraps placed in the autoclave serves to calculate the quantity of water and the possible additives to be used in processing.

D. The scraps, as outlined above under A), B) and C), must be introduced in an autoclave which operates under pressure, preferably one adapted to work up to a working pressure of 40 atmospheres with a margin of safety, a pressure which, in practice, has proven to be adapted to the treatment of any scraps known at present, the autoclave being preferably of the kind rotated about an eccentrical axle of the kind shown in the single Figure of the accompanying drawing. The autoclave should be equipped in the outer portion of the rotary container, with a conventional heating appliance, adapted to maintain it at a controlled temperature in a constant way, while taking into account the heat losses in the metal mass and in the mass of the scraps being processed, so as never to exceed in the interior of the autoclave a temperature over the curing temperature of the scraps being processed, the internal temperature being at least lower by 20° C than the curing temperature. The loading of the scraps in the autoclave should be effected upon preheating of the autoclave, at a temperature which in any case must be at least 20° C below the curing temperature of the scraps to be processed.

The autoclave as shown in the drawing is made up of an alloyed steel container 1, adapted to operate under high pressures at a working pressure of 42 atmospheres and at a temperature of 250° C. The container has one or more manhole doors in the eccentrical points 2, two hollow arms emerging from the sides 3 in an eccentrically offset position relative to the container axle. The two arms 3 are borne by bearings 5 and these, placed on supporting members resting on a frame 6, sustain the container on two sides in an offset position so as to permit the rotation of the vessel in the manner which is necessary to have the scraps being processed subjected to a double rotary and oscillatory motion. In the interior of either hollow arm 3, rotated together with the vessel, a fixed hollow tube 11 is passed, having a gland 16, a cooling chamber 15 within which several communication ways 12, 13, 14 pass from the interior to the outside of the container. The container, in addition to being fed in its interior with indirect pressurized fluids has also an outer fluid heating means, that is by means of a tube bank 10, with inlet and outlet terminals 17, 18 for the heating fluids connected to the manifold 19 to permit the feed of fluids at controlled temperatures, which are constant during rotation. One or more of the communication ways 12, 13, 14 are extended into the interior position by one or more hollow shafts 7, which emerge in the top position of the container, as commonly used in the rotary containers to exploit an ampler inner volume when treating dusty and fluid substances so as to keep free the way of communication towards the outside. The autoclave is completed with several apparatus for the rotary movement and for controlling the temperature in the interior and the exterior of the vessel, as made in the appropriate way with conventional means.

It should be noted, at the outset, that the description of the treatment according to the invention is referred to the use of the autoclave rotated about an eccentrical axle according to the single FIGURE of the drawing, which is apter than other types of autoclave which are rotary or equipped with apparatus adapted to induce the movement of the vulcanizate inside the container, since it transfers to the vulcanizates not only rotational movement but also lateral motion. The concurrence of both effects approaches and keeps far way, alternatingly, the substances which originate in the vulcanization being treated, the dielectric effects tending to annul the degree of polarization as acquired by rubber as it is cured. Many kinds of rotary autoclaves equipped with tubes emerging into the interior of the vessel to exploit a greater inner volume and to keep the way of communication towards the outside free, are widely used and, by way of example, there can be indicated the rotary autoclave, with axial rotation movement, the subject of the British patent specification No. 470,898 of March, 1936.

E. As the scraps prepared as suggested in (A), (B), (C) above have been placed in the autoclave of the indicated kind, the ways of communication from the interior to the outside of the autoclave are closed, so as to operate it under pressure and the treatment is started by the effects of the following stresses:

1. The autoclave is driven to rotation, the rotary movement being compulsorily continued throughout the entire treatment time. By so doing, the scraps are subjected to the effects of movement, which in the eccentrical autoclaves is both rotary and oscillatory, that is double-acting.

The autoclave is then fed, through the specially provided inlet ducts, with saturated steam, dispensed at a temperature not exceeding 150° C, that is, at a maximum pressure of 5 atmospheres until the scrap mass being treated reaches a temperature of about 110° C. The amount of water fed into the autoclave in the form of steam should be limited to the percentage which is the most suitable for the kind of scrap being treated, but preferably confined between 5% and 10%, the amount of steam being varied according to the experience and possibly arriving at the temperature of about 110° C (as outlined above) by heating the autoclave from the outside. It is extremely important, at any rate, that all the treatments of the same kind of scraps are effected with the same amount of water. Moisture, even above 10% (but always by a little extent), is not detrimental, but extends the processing time as well as the drying time and in such a case it must be kept constant when treating the same kind of scraps in order that a constant plasticization degree may be obtained.

3. Still through the specially provided inlet ways, after having fed steam to the autoclave as outlined above, air (or suitable like fluids) is fed at a temperature which is preferably room temperature and under a pressure varying from 10 to 30 atmospheres, in addition to the pressure as given by the steam. The air pressure is varied according to the quality of the scraps being treated, as will be specified hereinafter.

F. As soon as the mass being processed, due to the mechanical effect of the movement under pressure of the concentration of steam, air and/or external heating of the autoclave, reaches the temperature of about 110° and the pressure which is considered to be the most suited to the quality of the scraps being processed, the plasticization period is started, which, for the great majority of the vulcanizates, varies from 15 to 30 minutes, consistently with the expected degree of plasticity.

G. On completion of the treatment time, the outlet ducts of the autoclave are opened, preferably by stopping the rotation of the autoclave. And as soon as the gauge pressure is zero, the rotary motion is resumed for 10 to 15 minutes approximately, or even longer, if necessary, to remove the excess moisture, to be checked on a specially provided visible outlet to be inserted in the outside dumping ducts. During treatment, discharge of the pressure and drying, the external heating of the autoclave must constantly be maintained at temperatures adapted to the evaporation of water, thus at temperatures slightly below the curing point of the scraps under processing; as outlined above, the curing point of those scraps is for the great majority of the cured rubber scraps is about 150° C so as to produce, even taking into account the heat losses, the evaporation of the residual water within a reduced period of time. Whereas, during processing, an external heating of the autoclave at a temperature even slightly below the curing point of the scraps being treated, on account of the heat losses through the metal mass of the autoclave and the scraps loaded therein, ensures that the required limits are never overtaken.

H. On completion of drying, as indicated by the specially provided visual check, the rotation of the autoclave is discontinued and the mouth is kept at the top by means of a specially provided electromagnetic brake, the door is withdrawn and the rotation of the doorless autoclave is resumed. By so doing, the plasticized scraps, in loose condition, urged by the combined rotary and swinging motion to fall onto the open door position, emerge through the autoclave door and fall into underlying containers, wherefrom they can be automatically sent to further processing. The dumping of the scraps from the autoclave takes place without leaving any residues, and this takes less than five minutes.

Thus the plasticization treatment in eccentrically rotating autoclave is completed, with a processing cycle which takes, as from the loading of the vulcanizates in the autoclave to the discharge of the plasticized scraps, from 60 to 90 minutes according to the kind of scraps being processed. In practice, the invention is based on the possibility of achieving the plasticization of the vulcanizates through a different interpretation of the existing reclaimation theory. The interpretation underlying the invention is based on the fact that the thermal stresses at temperatures below the curing points of the scraps being treated, along with effects of stresses as produced by the rotary motion, preferably with swinging, and by the pressure of fluids basically composed by air (or like suitable fluids) and water, always dispensed at temperatures below the curing points of the scraps being treated, allow for the plasticization of the vulcanizates as available nowadays, even when they are composed by an admixture of several different polymers. The in a practical and economically satisfactory way, reclaimed rubber can be produced which has physical properties which are definitely improved over those obtainable with the conventional procedures, the degree of plasticity being susceptible of being adjusted according to various requirements.

As a rule, the stresses should be used with individual magnitues below the dielectric rigidity of the quality of scrap under processing and should be maintained within said limits during a time which is sufficient to plasticize them to the desired degree.

In practice, the treatment must be carried out by pressure and temperature stresses having magnitude lesser than those which are normally used for curing the quality of scraps under treatment. Nevertheless, the conditions of the process of the invention, with respect to the curing point of the unreclaimed rubber, are brought to the maximum permissible magnitude in order to reduce the treatment time, as these are the conditions which are the most favourable in order that the vulcanizates may show the reversal effects on their degree of polarization.

Inasmuch as it is a fundamental rule to vary the use of the stresses according to the quality of the scraps to be treated, it being necessary to be acquainted with the effects of said stresses, in the following a few complementary suggestions will be given as to the mutual interaction and of the plasticization-inducing stresses; movement, pressure and temperature, for a certain period of time.

1. The movement of the scraps, which is obtained by driving the autoclave to rotation, can be the same for all the kinds of vulcanizates. The essential condition is that the movement of the scraps in the autoclave, irrespective of the exact manner of effecting agitation, does not centrifuge them, or produce lumped scrap pockets which are withdrawn from the admixing with the moving mass.

2. The pressure is provided by feeding the autoclave with saturated steam dispensed under a pressure corresponding to a temperature below (even only slightly below) the curing points of the treated scraps. For the great majority of the scrap types a pressure of 5 atmospheres can be employ, in addition to a quantity of air or like suitable fluids, at a temperature which is preferably the atmospherical ambient temperature, the pressure magnitude being variable from 10 to 30 atmospheres and even over, depending on the quality of the scraps being treated.

The maximum pressure of 30 atmospheres is suggested for practical reasons concerning the use and the construction of the most suited autoclaves, not as an absolute limit. However, higher pressures are not recommended since the duration of the treatment would be greatly curtailed, and thus the beneficial effects which accrue because of concurrent agitation during the pressure and heat treatment of the steps, would be decreased, if not all together eliminated because of the shortened period during which agitation could be effected. Independent of the composition of the scraps, the pressurized fluids may be used within the indicated range of from 10 to 30 atmospheres and allow the use of autoclaves in the process of the invention to be operated at 40 atmospheres (with a margin of safety), since the pressure of the total system may rise by a few atmospheres during processing depending on the composition of the scrap material being treated. A minimum value of 10 atmospheres pressure is suitable under those conditions under which the scraps which are being treated had been cured at lower pressures; at this pressure, the mechanical stress (at a temperature below the curing point) does not exceed the dielectric properties of any of the scraps of any composition, unless the processing time of many hours is employed.

The Shore A hardness of the composition of the scraps to be processed may be used as a criterion for determining value of the pressure of air or other suitable like fluids, to be used with the various kinds of scraps, depending upon the type scraps, scraps with a Shore A hardness of about 55–60 units, are processed at 20 atmospheres, plus 5 atmospheres of steam, and proportionally, the pressure is to be increased or decreased consistently with the Shore A hardness of the scraps. For both technical and commercial reasons, it is practically advisable to carry out the treatments by using the suggested pressures, at which operation is easy and the polarization-reversal effect on the vulcanizates is observed, without resorting to higher pressures, which would render both the autoclaves and systems expensive, and the processing inconvenient. Presumably, with the lapse of time and further developments, it will be possible to use higher air (or like fluids) pressures, while still relying on the basics of the ideas of the present invention.

3. Temperature: as a rule, the determination of the magnitude of the thermal stresses which are adapted to the plasticization of any kind of scraps can easily be determined since it is proportional to the curing temperature conventionally used for curing the quality of scraps being treated. Those skilled in the art know the approximate temperatures at which the several rubber articles, from which the scraps come, are usually cured so that they can have an idea and use lower temperatures and with an appropriate margin of safety, preferably 20° C below the curing point. This is because the vulcanizates reach their optimum cure during a certain time mainly owing to the effect of thermal stresses: the pressure at which the goods are cured acts as a concurrent effect with the thermal stress in producing polarization. This is why the dielectric rigidity of the vulcanizates has an endurance limit to thermal stresses concurrently with pressure equal to, or lower than, the curing pressures, the limit being at least equal to their curing temperature, this latter varying according to the quality.

Thus, by operating in the plasticization runs according to the invention with a margin of safety of about 20° C below the optimum cure, even roughly assessed, the limits are not surpassed as they are necessary to work under pressures which are even higher than those to which the vulcanizates had been subjected, according to their nature, in order to shape and cure them.

4. The duration of the treatment is a function of the following parameters:

the scrap quantity the scrap grit size, either for triturated or powedered scraps the percentage of water relative to the weight of the scraps subjected to treatment the magnitudes of the mechanical and thermal stresses which are used the degree of final plasticity one desires to obtain the kind of autoclave, either rotary or having an internal rotary movement impressed thereto, as used for treatment.

By increasing the magnitudes of the thermal stresses or the pressure (within the permissible ranges) in the processing runs with scraps of the same type, the duration is decreased, until finding the optimum of these factors, in order to obtain an appropriate degree of plasticization.

By decreasing the magnitudes of the above enumerated stresses, the processing duration is increased, as well as the intermediate space for governing the treatment, especially with the kinds of scraps which are must sensitive to the stresses.

Thus the duration time is a function of the skill of the technologists in applying the method according to its basic ideas, in the above suggested ways and within the specified ranges.

On the other hand, the compounding of rubber mixes is a function of the skill of the technologists when searching for the best compound, by trials, and the data for arriving at an optimum are taken from the analysis of the cured samples. In reclaiming, the procedure is similar, on taking the several critical parameters into due account.

In practice, the duraction time of the process must be adjusted with the aid of experience, taking into account the six conditions on which depend, with a procedure similar to that used by the technologists to adjust the compounds, formulas, the curing temperatures and the curing times. This invention thus provides a novel reclaiming technology for vulcanizates, which allows monitoring the treatments and standurizing the production of reclaimed rubber. The plasticization of the great majority of the most common vulcanizates, that is those coming from tires, is carried out perfectly, even without the use of plasticizer and/or peptizing agents, the processing cycles being quick and cheap.

Such ingredients are helpful and can be used with particular types of vulcanizates, still operating with stresses within the specified ranges and conditions.

Thus, the catalytic effect of the peptizing agent, that is, that of accelerating said reactions, can be exploited in order to reduce the processing times when treating certain particular types of reclaimation-resistanct scraps, as is well known to those skilled in the art.

Although the method is based on very intricate scientific concepts, and this is evidenced by the fact that up to now the reclaiming of vulcanizates composed by various types of polymers has not found a clear interpretation, and while the description of the method illustrates only that part which is of interest to the technologists in order to reduce it to practice, the practicality of undertaking the process of the invention is extremely easy, by operating in the specified way and within the suggested ranges.

By way of a practical example, there are given the treatment parameters for plasticization in an eccentrical-axle rotary autoclave as depicted in the Figure of the drawing, of two types of radically different cured rubber scraps, that is, tire scraps from van tires and motor car tires (coming from tire recapping shops) and latex scraps composed by gloves and bathing caps (refuses).

1. Treatment of tire scrapings

The ground scraps, stripped of the cord plies and the iron impurities in the conventional manner, and screened to a grit size preferably of about 10 mesh and about 3% moisture, are charged into an autoclave of the kind shown in the drawing, which has been previously preheated to 140° C by external heating. Upon closing the door and the outlet ducts, the autoclave is driven to rotation and the vessel is charged, through the suitable inlet ducts, initially with saturated steam dispensed at 5 atmospheres until bringing the scrap mass to 110° C (to be checked on the thermocouple of the special process control electric switchboard). Then there are introduced 20 atmospheres of air pressure until attaining a total pressure of 25 atmospheres. Once this pressure has been reached, the timer mounted on the control switchboard is set to 30 minutes of processing time. During the treatment, the temperature of the scraps, as seen on the checking meter, rises to about 130° C–140° C. Should the temperature rise further, the pressure should be released by a few atmospheres through the specially provided outlets, thus bringing the pressure value to the magnitude which is necessary to prevent the temperature from exceeding 150° C. On completion of the treatment time as preset on the timer, which is signalled by light and sound signals, the rotary motion of the autoclave is stopped and the pressure is released until the specially provided gauges are at zero. Then the rotation of the autoclave is resumed and the valve is opened of a visual check placed on the outlet pipe to check when the emission of steam is over, that which indicates the time of drying: the latter is usually from 10 to 15 minutes. At this stage the rotation of the autoclave is stopped with the autoclave manhole in the top position (this can be obtained by reversing the rotation and an electromagnetic brake). The door is removed and the autoclave rotated again without the door so as to dump the plasticized scraps from the autoclave: these should preferably sent at once to the hopper of a refining mixer having its rollers heated and simply contacting without tightening them, the heating temperature being such as to evaporate the residual moisture. There, a single quick pass is enough to have the scraps adequately dry to be passed to the refining machines and, after two passes between tightly set rollers, a sheet of reclaimed rubber is produced, which is smooth and cyclization-free. The reclaimed rubber thus obtained has physical properties which of course are a function of the quality of the processed scraps, but which have average values of 100 to 120 kilogram sq. centimeter for tensile strength, an elongation to break of 300–350% and a Mooney plasticity 100° M.L. of 50-55. These properties can be adjusted, however, according to the requirements, by varying the autoclaving duration time.

2. Treatment of latex scraps composed by gloves and bathing caps.

The scraps are ground also without taking care of the grit size and charged in an autoclave in pieces, as they have a thickness not exceeding 0.5 millimeters, they are homogeneously plasticized even in pieces as obtained with two grinding or chopping passes. The same procedure can be used for all kinds of scraps having thickness up to about 0.5 millimeters.

With such latex scraps the same procedure is adopted as for the tire scrapings, but by varying the parameters:

Outside temperature of the autoclave: 130° C
Scrap moisture: about 5%
Pressure: steam dispensed at 5 atmospheres until attaining a temperature of 110° C for the scraps under treatment, plus 10 atmospheres of air pressure, the pressure totalling 15 atmospheres.
Duration of treatment: 15 minutes
Drying time: 30 mins. approx.

The refining procedure is the same as indicated for the tire scrapings for all kinds of scraps, that is, a quick pass for drying with the two rollers in contact only and heated, and two refining passes. This is an indication for designing in an installation appropriate lines of automatic production equipped with a heated roller refiner which can serve several production lines as composed by two refiners, whose output can be calculated on a size basis, that is the roller diameter and length. It should be noted, however, that by autoclaving powders having a grit size in the order of 144 meshes per square centimeter, or finer, and after passing the material through the first drying refiner, even a single refining pass is sufficient alternatively, the material can be used directly when preparing reclaimed compounds in closed mixers for a few kinds of compounds.

This very practical and economical possibility has been described. The the homogeneous plasticization of the instant method allows for using various kinds of scraps and/or with appropriate grit sizes. The nature of the latex scraps, the treatment time of producing the plastic state have been. After a quick refining pass with the rollers heated above 100° C, have been used to blend a mix with 20 parts by weight of reinforcing fillers and 5 parts of natural rubber, the treated samples characterized by the following properties:

Specific gravity: 1.16
Tensile strength: 138 kgs/sq.cm
Elongation at break: 615%
Shore A hardness: 58-60

It is thus demonstrated that, in accordance with the invention, the novel plasticization method provides novel processing technologists in the refining and the use of reclaimed rubber.

With the two examples set forth above and the foregoing suggestions, the values of the stresses to be adopted in the treatment of the several kinds of scraps can be obtained.

The results the method permits to obtain are:

1. The technologists are enabled to monitor the treatments according to a rational technique adopt a theory which interprets the causes of the reactions which take place.

2. Cyclizations, as well as the processing difficulties experienced with conventional methods for treating vulcanizates, are obviated the vulcanizates referred to here are those composed of mixed polymers and conductive fillers, used in tires of any kind, even of the touring kind, which are an important source of reclaimable vulcanizates which are now difficult to use and are bulky.

3. With the autoclave treatment it is possible to obtain plasticizations which can be adjusted according to the requirements, the degree of plasticity being both even and constant.

4. The scraps, as homogeneously plasticized in the autoclave, are refined with one or two passes, and/or can be used without refining them, easily and cheaply.

5. The simplicity of the instant autoclave treatment permits the adoption of automatized, high-output production cycles, which reduces the costs.

6. Reclaimed rubber is obtained having physical properties, with respect to the scraps being treated, which are positively improved over those which could be conventionally obtained.

7. By working without plasticizing and peptizing agents to treat the vulcanizates, especially those coming from a large mass of old tyres, with quick production cycles at low temperatures and by sparing motive power to refine them, the method is extremely cheap.

8. Reclaimed rubber, as produced in accordance with the invention, is lower in costs and its qualitative features which are competitive with raw rubber, will persuade the manufacturers of rubber goods to make a wide and remunerative use thereof.

What is claimed is:

1. A method of reclaiming rubber, consisting essentially of the combination of steps of heating scraps of cured rubber which have been freed of non-rubbery components, the compositions of the scraps being identical or compatible and the size of the scraps being substantially uniform, at a temperature below the curing temperature of said scraps in an autoclave which is heated externally while subjecting said scraps to agitation to effect even mixing and constant movement of said scraps, said heating and agitating of the scraps being undertaken in the presence of water in the form of steam equal to a percentage by weight of the scraps which percentage may vary from 5 to 10% wherein the exact amount of water relative to said scraps is controlled to determine the extent to which the scraps become plastic and in the presence of air, the volume of which is sufficient to effect a pressure within the autoclave of between 10 and 30 atmospheres, for a period of time sufficient to cause the contents of the autoclave to reach a temperature of about 110° C and continuing said treatment for a period of time of at least 15 minutes which is a period of time sufficient to plasticize said scraps.

2. A method according to claim 1, characterized in that the treatment of the scraps takes places at a temperature which is at least 20° C below the curing temperature of the scraps to be reclaimed.

3. A method according to claim 1, characterized in that the treatment of the scraps takes place under a pressure not higher than 40 atmospheres.

4. A method according to claim 1, characterized in that the treatment of the scraps in the autoclave and under pressure takes place at the ambient air temperature.

5. Reclaimed rubber from vulcanizates, as obtained by the method according to claim 1.

6. A method according to claim 1 wherein agitation is effected to avoid centrifuging of the scraps.

* * * * *